United States Patent
Richter et al.

(10) Patent No.: US 6,495,252 B1
(45) Date of Patent: Dec. 17, 2002

(54) MAGNETIC RECORDING MEDIUM WITH SUPERPARAMAGNETIC UNDERLAYER

(75) Inventors: Hans J. Richter, Palo Alto, CA (US); Samuel Dacke Harkness, San Francisco, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 111 days.

(21) Appl. No.: 09/619,390

(22) Filed: Jul. 19, 2000

Related U.S. Application Data

(60) Provisional application No. 60/145,493, filed on Jul. 22, 1999.

(51) Int. Cl.⁷ .................. G11B 5/70; G11B 5/66
(52) U.S. Cl. .................. 428/336; 428/694 TS; 428/694 TM; 428/900
(58) Field of Search .................. 428/694 TM, 694 TS, 428/694 TP, 694 T, 900, 694 TB, 336, 65.5, 65.7

(56) References Cited

U.S. PATENT DOCUMENTS

| | | | |
|---|---|---|---|
| 4,677,032 A | 6/1987 | Robinson | 428/611 |
| 4,810,401 A * | 3/1989 | Mair et al. | 252/62.56 |
| 4,824,587 A | 4/1989 | Kwon et al. | 252/62.55 |
| 4,878,140 A | 10/1989 | Gill et al. | 360/113 |
| 5,176,965 A * | 1/1993 | Mallary | 428/694 |
| 5,236,783 A | 8/1993 | Aoki et al. | 428/403 |
| 5,368,933 A | 11/1994 | Aoki et al. | 428/329 |
| 5,485,334 A | 1/1996 | Nix et al. | 360/113 |
| 5,492,745 A * | 2/1996 | Yokoyama | 428/65.3 |
| 5,543,221 A * | 8/1996 | Kitikami et al. | 428/332 |
| 5,589,262 A | 12/1996 | Kiuchi et al. | 428/336 |
| 5,634,260 A | 6/1997 | Nix et al. | 29/603.14 |
| 5,654,854 A | 8/1997 | Mallary | 360/113 |
| 5,733,370 A | 3/1998 | Chen et al. | 117/105 |
| 5,830,588 A | 11/1998 | Douglass et al. | 428/694 |
| 5,846,648 A * | 12/1998 | Chen et al. | 428/332 |
| 5,928,958 A | 7/1999 | Pilgrimm | 436/526 |
| 6,338,777 B1 * | 1/2002 | Longstreth White | 204/192.15 |

* cited by examiner

Primary Examiner—Holly Rickman
(74) Attorney, Agent, or Firm—McDermott, Will & Emery

(57) ABSTRACT

High bit density, longitudinal and/or perpendicular magnetic recording media that are substantially free of Barkhausen noise are fabricated by utilizing magnetically soft, superparamagnetic underlayers which are compatible with the grain structure of the magnetic recording layer and serve to guide magnetic flux through the magnetic layer. An exchange de-coupling layer is positioned between the superpararnagnetic underlayer and the magnetic layer for prevention of direct coupling of the grains of each the layers.

19 Claims, 1 Drawing Sheet

MAGNETIC RECORDING MEDIUM WITH SUPERPARAMAGNETIC UNDERLAYER

CROSS-REFERENCE TO PROVISIONAL APPLICATION

This application claims priority from U.S. provisional patent application Ser. No. 60/145,493 filed Jul. 22, 1999, the entire disclosure of which is incorporated herein by reference.

FIELD OF THE INVENTION

The present invention relates to improved magnetic information/data recording, storage, and retrieval media and a method for manufacturing same. More specifically, the present invention relates to magnetic media in which Barkhausen noise is substantially eliminated by provision of a magnetically soft superparamagnetic underlayer, and a method for manufacturing same. The invention has particular utility in the manufacture and use of extremely high bit density magnetic recording systems utilizing a single pole vertical (i.e., perpendicular) recording head.

BACKGROUND OF THE INVENTION

Magnetic media are widely used in various applications, particularly in the computer industry, and efforts are continually made with the aim of increasing the recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a magnetically "soft" underlayer, i.e., a magnetic layer having relatively low coercivity, such as of a NiFe alloy (Permalloy), between the non-magnetic substrate, e.g., of glass, aluminum (Al) or an Al-based alloy, and the perpendicular magnetic recording layer, e.g., of a cobalt-chromium (Co—Cr) alloy having perpendicular anisotropy. The magnetically soft underlayer serves to guide magnetic flux emanating from the head through the perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

A typical perpendicular recording system 10 utilizing a vertically oriented magnetic medium with a soft magnetic underlayer, and a single-pole head is illustrated in FIG. 1, wherein reference numerals 2, 3, and 4 respectively indicate the substrate, soft magnetic underlayer, and vertically oriented magnetic recording layer of perpendicular magnetic medium 1, and reference numerals 6 and 7 respectively indicate the single and auxiliary poles of single-pole magnetic transducer head 5. As shown by the arrows in the figure indicating the path of the magnetic flux φ, flux φ is seen as emanating from single pole 6 of single-pole magnetic transducer head 5, entering and passing through vertically oriented magnetic recording layer 4 in the region above single pole 6, entering and travelling along soft magnetic underlayer 3 for a distance and exiting therefrom and passing through vertically oriented magnetic recording layer 4 in the region above auxiliary pole 7 of single-pole magnetic transducer head 5. The direction of movement of perpendicular magnetic medium 1 past transducer head 5 is indicated in the figure by the arrow above medium 1.

However, a significant problem and drawback associated with the utilization of soft magnetic underlayers, such as layer 3 shown in FIG. 1, is the generation of noise resulting from, inter alia, pinning and unpinning of the magnetic domain walls, termed "Barkhausen noise", which noise adversely affects performance characteristics of magnetic media, particularly high bit density magnetic media.

Accordingly, there exists a need for improved, high bit density perpendicular (and longitudinal) magnetic information/data recording, storage, and retrieval media including magnetically soft underlayers but which exhibit greatly reduced, or no Barkhausen noise. In addition, there exists a need for improved, low Barkhausen noise, high bit density perpendicular and longitudinal magnetic media employing magnetically soft underlayers which are fabricated by conventional manufacturing techniques, e.g., sputtering.

The present invention addresses and solves problems attendant upon the use of magnetically soft underlayers in the manufacture of high bit density perpendicular and longitudinal magnetic media, e.g., Barkhausen noise, while maintaining all structural and mechanical aspects of high bit density recording technology. Moreover, the magnetic media of the present invention can be fabricated by means of conventional manufacturing techniques, e.g., sputtering.

DISCLOSURE OF THE INVENTION

An advantage of the present invention is an improved, high bit density, magnetic information/data recording, storage, and retrieval medium including a magnetically soft underlayer, which medium is substantially free of Barkhausen noise.

Another advantage of the present invention is an improved, high bit density, perpendicular-type magnetic recording medium including a magnetically soft, superparamagnetic underlayer, which medium is substantially free of Barkhausen noise and well-suited for use with a single-pole magnetic transducer head.

Yet another advantage of the present invention is an improved, high bit density longitudinal-type magnetic recording medium including a magnetically soft underlayer, which medium is substantially free of Barkhausen noise.

Additional advantages, aspects, and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a high bit density magnetic information/data recording, storage, and retrieval medium substantially free of Barkhausen noise, comprising:

a non-magnetic substrate having a surface for layer stack formation thereon; and a stack of polycrystalline layers formed over the substrate surface, the layer stack comprising, in sequence from said substrate surface:

an underlayer;
at least one layer pair composed of:
  a magnetically soft superparamagnetic underlayer over-lying the underlayer; and
  an exchange de-coupling layer overlying the magnetically soft superparamagnetic underlayer; and
a high bit density magnetic recording, storage, and retrieval layer;
wherein the grains constituting each of the polycrystalline layers of the layer stack have substantially the same width.

According to embodiments of the present invention, the medium comprises a high bit density perpendicular-type or longitudinal-type magnetic recording medium; the magnetically soft superparamagnetic underlayer is from about 4 to about 12 nm thick, e.g., about 5 to about 8 nm thick, the exchange de-coupling layer is from about 0.5 to about 5 nm thick, e.g., about 0.5 to about 3 nm thick; and the width of the grains constituting each of the polycrystalline layers of the layer stack is from about 5 to about 15 nm, e.g., 10 nm.

According to further embodiments of the present invention, the magnetic medium comprises a stacked plurality of the layer pairs, each pair consisting of a magnetically soft superparamagnetic underlayer and an overlying exchange de-coupling layer.

According to yet further embodiments of the present invention, the at least one magnetically soft superparamagnetic underlayer comprises at least one ferromagnetic or ferrimagnetic material; the ferromagnetic or ferrimagnetic material being selected from iron (Fe); Fe-rich alloys, e.g., iron-chromium (Fe—Cr) alloys; Fe-oxides; cobalt (Co); Co-rich alloys, e.g., cobalt-chromium (Co—Cr) alloys; and Co-oxides; and the ferromagnetic or ferrimagnetic material may include boron (B).

According to embodiments of the present invention, the exchange de-coupling layer may comprise chromium (Cr) or a Cr-based alloy; the underlayer may comprise Cr or a Cr-based alloy; and the high bit density magnetic layer comprises a Co-based alloy including one or more elements selected from Cr, Fe, Ta, Ni, Mo, Pt, V, Nb, Ge, and B.

According to further embodiments of the present invention, the non-magnetic substrate comprises glass or aluminum (Al) or an Al-based alloy, e.g., an aluminum-magnesium (Al—Mg) alloy, having a plating layer, e.g., of nickel-phosphorus (Ni—P), on the surface thereof; and the medium further includes a protective overcoat layer overlying the magnetic layer and a lubricant topcoat layer overlying the protective overcoat layer.

According to another aspect of the present invention, a high bit density magnetic information/data recording, storage, and retrieval medium comprises:
  a high bit density magnetic layer; and
  layer means for substantially eliminating Barkhausen noise from the medium.

Additional advantages and aspects of the present invention will become readily apparent to those skilled in the art from the following detailed description, wherein embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not limitative.

BRIEF DESCRIPTION OF THE DRAWINGS

The following detailed description of the embodiment of the invention can best be understood when read in conjunction with the following drawings, in which like reference numerals are employed throughout to designate similar features, wherein.

It should be noted that the various layers shown in the FIGS. are not drawn to scale, but rather are shown as to best illustrate the features of the present invention.

DESCRIPTION OF THE INVENTION

The present invention addresses and solves problems arising from the generation of Barkhausen noise in magnetic recording media employing magnetically soft underlayers, e.g., of NiFe (Permalloy). According to the present invention, high bit density magnetic recording, storage, and retrieval media of either perpendicular or longitudinal type substantially free of Barkhausen noise are fabricated by substituting a layer or film of a very finely grained (i.e., polycrystalline), magnetically soft material for the continuous, magnetically soft films or layers conventionally utilized as underlayers. Stated differently, the magnetically soft underlayer is made of a ferromagnetic or ferrimagnetic material in the form of a polycrystalline layer having a relatively weak magnetic anisotropy and a small grain size which is equal, or at least comparable, to that of the magnetic recording layer itself. A key feature of the present invention resides in the grain or particle size of the magnetically soft underlayer. Specifically, the grain or particle size of the ferromagnetic or ferrimagnetic material utilized for the magnetically soft underlayer is sufficiently small, such that the grains (i.e., particles) thereof become superparamagnetic, i.e., they remain magnetically ordered but lose their hysteresis.

Figure 1:
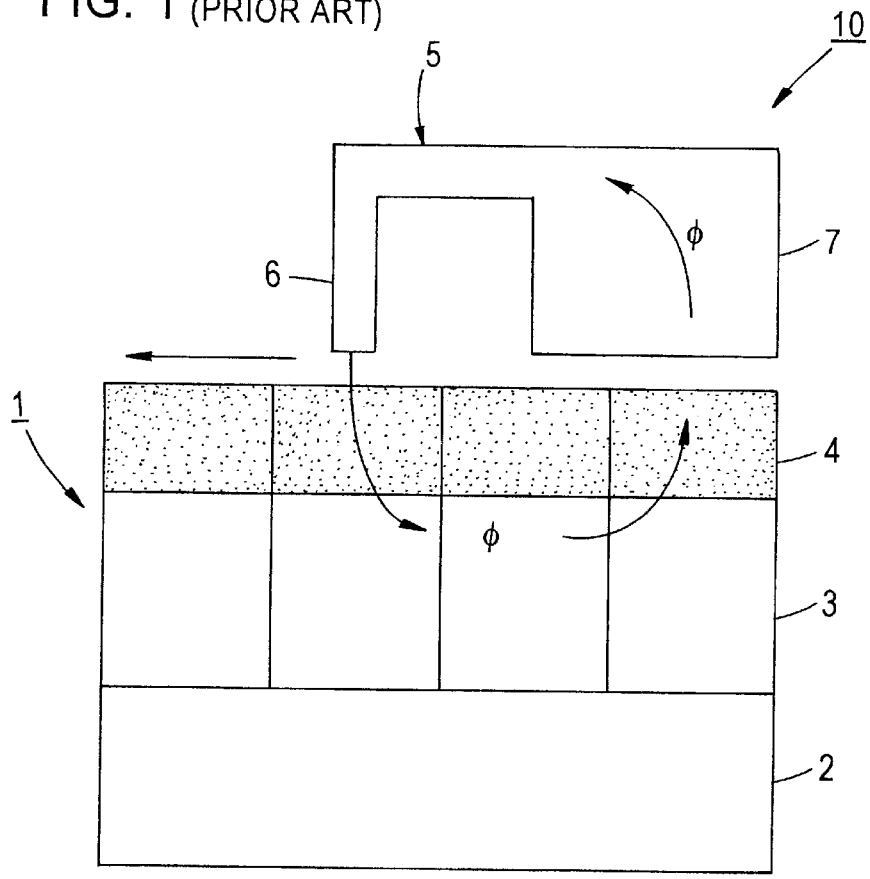
FIG. 1 schematically illustrates, in cross-sectional view, a magnetic recording, storage, and retrieval system comprised of a conventional perpendicular-type magnetic recording medium including a magnetically soft underlayer and a single-pole transducer head.

According to the present invention, when such a magnetically soft, superparamagnetic layer or film is placed beneath the magnetic recording, storage, and retrieval layer 4 of a magnetic medium 1 such as illustrated in FIG. 1, it is able to guide the magnetic flux $\phi$ in the same way as with a conventional, i.e., continuous magnetically soft underlayer, e.g., layer 3. However, a great practical advantage provided by the present invention is the compatibility of the polycrystalline (i.e., granular), magnetically soft, superparamagnetic underlayer with the polycrystalline (i.e., granular) structure of the magnetic layer 4. That is, whereas conventional magnetic media utilize underlayers for controlling the grain size of magnetic layer 4, the magnetically soft superparamagnetic underlayer of the present invention does not interrupt grain growth, as is inevitably the case with conventional magnetically soft underlayers.

Another key feature of the present invention is the placement of an exchange de-coupling layer between the magnetically soft, superparamagnetic underlayer and the magnetic layer 4, in order to prevent direct coupling of the grains of the superparamagnetic underlayer to the grains of the magnetic layer. Without such exchange de-coupling layer intermediate the superparamagnetic underlayer and the magnetic recording layer, the effective volume of the grains of the magnetic layer 4 would simply be increased and the superparamagnetic character of the underlayer lost. Stated somewhat differently, any interaction between the superparamagnetic underlayer and the magnetic layer must be purely magnetostatic.

According to the present invention, the thickness of the superparamagnetic layer cannot be increased at will because the superparamagnetic character is lost if the grain volume is too small. However, the amount of magnetic flux $\phi$ that can be guided through magnetic layer 4 can be increased by placing a stacked plurality of n superparamagnetic layer/exchange de-coupling layer pairs below the magnetic layer, where n is an integer from about 5 to about 20. In general, and as a first approximation, the magnetic energy $E_m=KV$ (where K is the anisotropy constant, including shape anisotropy, and V is the volume) must be less than 25 $k_BT$, where $k_B$ is the Boltzmann constant and T is the temperature in °K.

Figure 2:
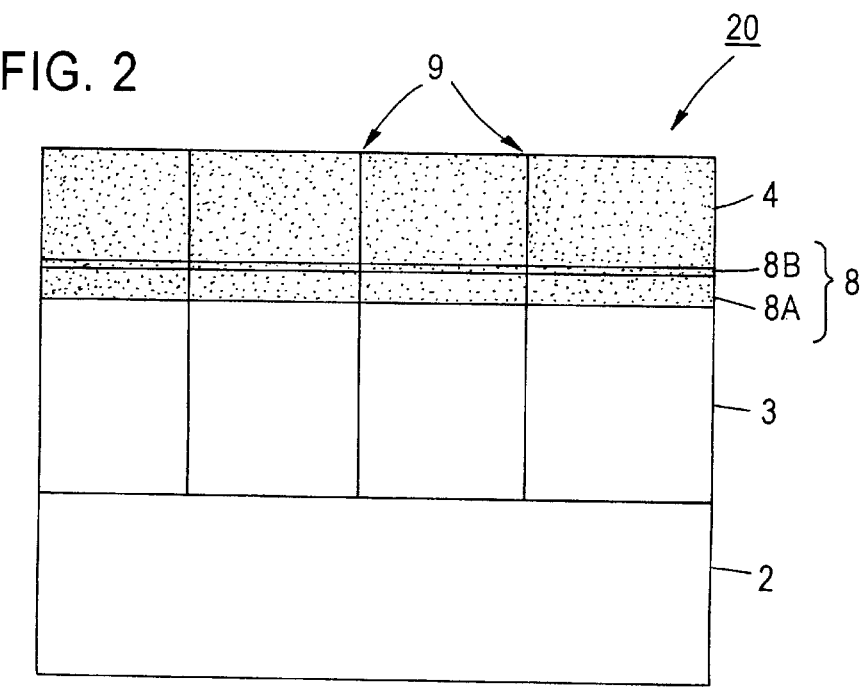
FIG. 2 schematically illustrates, in cross-sectional view, a perpendicular-type magnetic recording medium according to the present invention, comprising a magnetically soft, superparamagnetic underlayer.

Adverting to FIG. 2, illustrated therein in schematic, cross-sectional view, is a portion of a high bit density, perpendicular magnetic recording, storage, and retrieval medium 20 comprising a magnetically soft, superparamagnetic underlayer/exchange de-coupling layer pair 8 according to the present invention, wherein reference numerals 2, 3, 4 designate layers or features similar to those shown in FIG. 1, i.e., substrate, underlayer, and magnetic layers, respectively, and comprised of the same or similar materials. As illustrated, layer pair 8 is composed of a first, or lower, magnetically soft, superparamagnetic layer 8A in contact with the upper surface of underlayer 3 and a second, or upper, exchange de-coupling layer 8B in contact with the lower surface of magnetic layer 4. Vertical lines 9 indicate grain boundaries of each polycrystalline (i.e., granular) layer of the layer stack constituting magnetic medium 20. As apparent from the figure, the width of the grains (as measured in a horizontal direction) of each of the polycrystalline layers constituting the layer stack of medium 20 is substantially the same, i.e., each overlying layer replicates the grain width of the underlying layer. Not shown in the FIG., in order not to unnecessarily obscure the present invention, are a protective overcoat layer, such as of a diamond-like carbon (DLC) formed over magnetic layer 4, and a lubricant topcoat layer, such as of a perfluoropolyethylene material, formed over the protective overcoat layer.

With continued reference to FIG. 2, according to the invention, layers 2, 3, and 4 are composed of the same, or at least similar, materials and have similar layer thicknesses as in the conventional medium illustrated in FIG. 1. Accordingly, substrate 2 is typically comprised of a non-magnetic metal or alloy, e.g., Al or an Al-based alloy, such as Al—Mg having a plating layer on the deposition surface thereof, e.g., of Ni—P; underlayer 3 is typically comprised of an about 100 to about 2000 Å thick layer of Cr or a Cr—based alloy, such as Cr—V or Cr—Ti; and magnetic layer 4 is typically comprised of an about 100 to about 1000 Å thick layer of a Co-based alloy including one or more elements selected from the group consisting of Cr, Fe, Ta, Ni, Mo, Pt, V, Nb, Ge, and B.

According to the invention, magnetically soft superparamagnetic layer 8A of layer pair 8 may comprise at least one ferromagnetic or ferrimagnetic material selected from Fe, Fe-rich alloys, Fe-oxides, Co, Co-rich alloys, and Co-oxides, and is oriented with the applied magnetic field for providing noise reduction. Layer 8A may preferably include chromium and also include boron (B), both of which tend to concentrate at the grain boundaries and aid in isolation of the grains from each other. Layer 8A may be from about 4 to about 12 nm thick, e.g., from about 5 to about 8 nm thick. Exchange de-coupling layer 8B of layer pair 8 may comprise Cr or a Cr-based alloy, and is typically from about 0.5 to about 5 nm thick, e.g., from about 0.5 to about 3 nm thick.

The width of each of the grains of each layer of the layer stack constituting medium 20, measured in the horizontal direction in the drawing, may be from about 8 to about 12 nm, typically about 10 nm. Each of the constituent layers of the all-polycrystalline layer stacks fabricated according to the present invention may be conveniently deposited with such grain sizes by means of DC or RF sputtering, typically at sputtering gas pressures of from about 1–30 mTorr, substrate temperatures below about 240–350° C., and applied sputtering power densities leading to high deposition rates of about 10–200 Å/sec.

Medium 20 may, if necessary to provide a magnetically soft, superparamagnetic underlayer having a requisite thickness, comprise a stack of n such layer pairs 8 each composed of a lower, magnetically soft, superparamagnetic layer 8A and an upper, i.e., overlying exchange de-coupling layer 8B, where n is an integer from about 5 to about 20. In such instances, each of the layer pairs 8 need not be identically composed; rather, different combinations of the above-listed materials may be utilized as desired.

In principle, any ferromagnetic or ferrimagnetic material can be utilized for magnetically soft superparamagnetic underlayer 8A. However, inasmuch as low saturation alloys are not particularly useful, Fe-based and Co-based alloys main candidates for use as layer 8A, such as alloys utilized for standard magnetic media. Alloys containing Cr are preferred because the latter serves to isolate adjacent grains from each other. Boron (B) can also be included for this purpose in that it tends to concentrate at the grain boundaries, and it also increases the anisotropy field.

A key feature of the present invention is that the grain size of the magnetically soft, superparamagnetic underlayer 8A is identical to that of the magnetic recording layer 4. As a consequence, there is no freedom in choice of grain size of underlayer 8A in that it must conform to that desired for the magnetic recording layer 4. According to conventional practice, e.g., with longitudinal media, the grain size is controlled by use of underlayers (i.e., layer 3 in FIG. 2) comprising Ni—Al or Cr-based layers successively topped with thin Co—Cr layers and Cr layers. The Cr layers can be alloyed with one or more of V, Mo, Ru, W, and Ti, depending upon the exact lattice parameters of magnetic recording layer 4. According to the invention, the grain size, i.e., width as measured in the horizontal direction, is initially set by the underlayer stack 3 and maintained throughout successive deposition thereon of the magnetically soft superparamagnetic underlayer 8A, exchange de-coupling layer 8B, and the magnetic recording layer 4.

The grain volume at which a material becomes superparamnagnetic depends upon the particular material. The magnetic energy barrier at zero applied field is proportional to KV, where K is the anisotropy constant and V is the volume of the grain. The relaxation rate is then given by:

$$r = f_o e^{-KV/k_BT},$$

where $k_B$ is the Boltzmann constant, T is the temperature in °K, and $f_0$ is a frequency factor of about $10^9$ Hz. If the product KV is sufficiently small, e.g., ~25 $k_BT$, the relaxation rate is sufficiently high and the material has zero coercivity in the time frame of laboratory measurements, i.e., 1 second, and superparamagnetism is exhibited. Thus, according to the present invention, for superparamagnetic underlayer 8A, the condition is KV<25 $k_B$T. For, e.g., cylindrically-shaped grains, where the volume=$\pi D^2 \delta/4$, where $\delta$=grain height=film thickness and D=grain diameter, the film or layer thickness must be set such that the product KV is sufficiently small.

EXAMPLE 1

Fe has a desirable high magnetization and cubical lattice structure, for which the magnetocrystalline anisotropy can be neglected. On average, for no shape anisotropy, it is desired that the grain width D~grain height $\delta$. For Fe as the magnetically soft, superparamagnetic underlayer 8A, the grain volume at which KV<25 $k_B$T is ~800 nm$^3$. As a consequence, the layer thickness $\delta$=11.9 nm. Thus, 10 nm wide grains having a thickness of 12 nm would be the design target, although smaller-sized grains can be utilized, if desired.

EXAMPLE 2

Co has a uniaxial magnetocrystalline anisotropy, and thus the design of a magnetically soft superparamagnetic underlayer 8A utilizing Co is slighly different than for Fe. The anisotropy field for hexagonal Co is 525 kA/m and the saturation magnetization is 1440 kA/m. The c-axis should therefore be grown perpendicular to the film plane (as, for example, by use of Ti—Cr or Ge underlayers). For small total anisotropy, the grains of the superparamagnetic underlayer 8A are made flat rather than cylindrical, such that there is negative shape anisotropy with respect to the c-axis. The anisotropy fields of the shape anisotropy and the magnetocrystalline anisotropy should cancel for the mean grain. This condition is obtained at a grain aspect ratio of 0.418. Consequently, the thickness of a Co superparamagnetic underlayer 8A having 10 nm wide grains should be ~4 nm. The nominal grain would have zero anisotropy and be a perfect superparamagnet. However, deviations from this grain shape introduce anisotropy. Thus, taller grains can be utilized such that the previous idea that KV<25 $k_B$T still holds.

Thus, the present invention advantageously provides improved, high bit density, longitudinal or perpendicular magnetic data/information recording, storage, and retrieval media which include a magnetically soft, superparamagnetic underlayer which effectively eliminates Barkhausen-type noise associated with high bit density magnetic media utilizing conventional magnetically soft underlayers. The media of the present invention are especially useful in conjunction with single-pole recording/retrieval transducer heads and enjoy particular utility in high recording density media for computer-related applications. In addition, the inventive media can be readily fabricated by means of conventional methodologies, e.g., sputtering techniques.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetic information/data recording, storage, and retrieval medium substantially free of Barkhausen noise, comprising:
   a non-magnetic substrate having a surface for layer stack formation thereon; and
   a stack of polycrystalline layers formed over said substrate surface, said layer stack comprising, in sequence from said substrate surface:
   an underlayer;
   at least one layer pair composed of:
   a magnetically soft superparamagnetic underlayer overlying said underlayer; and
   an exchange de-coupling layer overlying said magnetically soft superparamagnetic underlayer; and
   a magnetic recording, storage, and retrieval layer;
   wherein the grains constituting each of said polycrystalline layers of said layer stack have substantially the same width.

2. The magnetic medium as in claim 1, comprising a perpendicular medium.

3. The magnetic medium as in claim 1, comprising a longitudinal medium.

4. The magnetic medium as in claim 1, wherein said magnetically soft superparamagnetic underlayer is from about 4 to about 12 nm thick and said exchange de-coupling layer is from about 0.5 to about 5 nm thick.

5. The magnetic medium as in claim 4, wherein said magnetically soft superparamagnetic underlayer is from about 5 to about 8 nm thick and said exchange de-coupling layer is from about 0.5 to about 3 nm thick.

6. The magnetic medium as in claim 1, wherein said width of said grains constituting each of said polycrystalline layers of said layer stack is from about 5 to about 15 nm.

7. The magnetic medium as in claim 6, wherein said width of said grains is about 10 nm.

8. The magnetic medium as in claim 1, comprising a stacked plurality of said layer pairs, each pair consisting of a magnetically soft superparamagnetic underlayer and an overlying exchange de-coupling layer.

9. The magnetic medium as in claim 1, wherein said at least one magnetically soft superparamagnetic underlayer comprises at least one ferromagnetic or ferrimagnetic material.

10. The magnetic medium as in claim 9, wherein said at least one magnetically soft superparamagnetic underlayer comprises at least one material selected from the group consisting of iron (Fe), Fe-based alloys, Fe-oxides, cobalt (Co), Co-based alloys, and Co-oxides.

11. The magnetic medium as in claim 10, wherein said magnetically soft superparamagnetic underlayer comprises at least one material selected from the group consisting of iron-chromium (Fe—Cr) and cobalt-chromium (Co—Cr) alloys.

12. The magnetic medium as in claim 10, wherein said at least one material of said at least one magnetically soft superparamagnetic underlayer includes boron (B).

13. The magnetic medium as in claim 1, wherein said exchange de-coupling layer comprises chromium (Cr) or a Cr-based alloy.

14. The magnetic medium as in claim 1, wherein said underlayer comprises chromium (Cr) or a Cr-based alloy.

15. The magnetic medium as in claim 1, wherein said magnetic layer comprises a cobalt (Co)-based alloy.

16. The magnetic medium as in claim 15, wherein said magnetic layer comprises Co alloyed with one or more elements selected from the group consisting of Cr, Fe, Ta, Ni, Mo, Pt, V, Nb, Ge, and B.

17. The magnetic medium as in claim 1, wherein said non-magnetic substrate comprises glass, aluminum (Al), or an Al-based alloy having a surface plating layer.

18. The magnetic medium as in claim 17, wherein said non-magnetic substrate comprises an aluminum-magnesium (Al—Mg) alloy and said plating layer comprises nickel-phosphorus (Ni—P).

19. The magnetic medium as in claim 1, further comprising:
- a protective overcoat layer overlying said magnetic layer; and
- a lubricant topcoat layer over said protective overcoat layer.

* * * * *